US008774368B2

(12) United States Patent
Bentley et al.

(10) Patent No.: US 8,774,368 B2
(45) Date of Patent: Jul. 8, 2014

(54) SYSTEM AND METHOD TO USE ENTERPRISE COMMUNICATION SYSTEMS TO MEASURE AND CONTROL WORKPLACE NOISE

(75) Inventors: Jon L. Bentley, New Providence, NJ (US); Anjur S. Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 26 days.

(21) Appl. No.: 13/491,940

(22) Filed: Jun. 8, 2012

(65) Prior Publication Data

US 2013/0329863 A1 Dec. 12, 2013

(51) Int. Cl.
*H04M 1/24* (2006.01)
*H04M 3/08* (2006.01)
*H04M 3/22* (2006.01)

(52) U.S. Cl.
USPC .............. 379/32.01; 379/38; 379/39; 379/48; 455/410; 455/411; 455/501

(58) Field of Classification Search
USPC ............ 379/32.01, 39, 41, 42, 44, 47, 48, 49, 379/38; 381/56, 57, 73.1; 340/539.26, 540, 340/541; 455/404.2, 410, 411, 414.1, 415, 455/456.1, 456.6, 501, 507, 508, 515
See application file for complete search history.

(56) References Cited

U.S. PATENT DOCUMENTS

| | | | | |
|---|---|---|---|---|
| 4,654,642 A * | 3/1987 | Groff | | 340/573.1 |
| 4,763,267 A * | 8/1988 | Knight et al. | | 701/117 |
| 5,287,398 A * | 2/1994 | Briault | | 379/102.01 |
| 6,529,128 B2 | 3/2003 | Weng | | |
| 7,366,674 B2 | 4/2008 | Dione | | |
| 7,450,472 B2 * | 11/2008 | Guyvarch | | 367/139 |
| 7,986,231 B1 * | 7/2011 | Bentley et al. | | 340/540 |
| 8,194,866 B2 * | 6/2012 | Smith | | 381/56 |
| 2003/0142833 A1 * | 7/2003 | Roy et al. | | 381/73.1 |
| 2004/0110544 A1 * | 6/2004 | Oyagi et al. | | 455/575.1 |
| 2005/0244014 A1 | 11/2005 | Elko et al. | | |
| 2009/0052677 A1 * | 2/2009 | Smith | | 381/56 |
| 2009/0096940 A1 | 4/2009 | Diethorn et al. | | |
| 2011/0003577 A1 * | 1/2011 | Rogalski et al. | | 455/404.1 |
| 2012/0139721 A1 * | 6/2012 | Betts et al. | | 340/539.11 |
| 2012/0147169 A1 * | 6/2012 | Harper et al. | | 348/77 |
| 2013/0002425 A1 * | 1/2013 | Hatch et al. | | 340/540 |
| 2013/0039497 A1 * | 2/2013 | Ramalho et al. | | 381/56 |

* cited by examiner

*Primary Examiner* — Binh Tieu
(74) *Attorney, Agent, or Firm* — Maldjian Law Group LLC; John Maldjian; Alexander D. Walter

(57) ABSTRACT

System and method are disclosed to mitigate noise in an area monitored by a plurality of telecommunication terminals in communication with a controller, the method including: detecting an excessive noise originating in the area monitored by the plurality of telecommunication terminals, the detection performed by one or more terminals of the plurality of telecommunication terminals; identifying a location of a first terminal of the plurality of telecommunication terminals by use of the detected excessive noise, wherein the first terminal is closest to a source of the excessive noise; and providing a mitigation message to the identified first terminal.

16 Claims, 7 Drawing Sheets

700

SYSTEM AND METHOD TO USE ENTERPRISE COMMUNICATION SYSTEMS TO MEASURE AND CONTROL WORKPLACE NOISE

BACKGROUND

1. Field of the Invention

The system and method relates to sensor networks and in particular to acoustic sensor networks for measuring and controlling noise within an area such as a workplace area or office environment.

2. Description of Related Art

Typically, alarm systems and telephone systems have been separate systems. The alarm/security systems usually have separate wiring, monitoring, and control systems. Many existing telephony systems utilize telephones that have the components necessary (e.g., a microphone and speaker (acoustic sensor)) to provide similar functionality as existing alarm/security systems. However, most alarm/security systems fail to utilize the existing telephone infrastructure. In addition, current systems fail to utilize all of the capabilities of acoustic sensors. Existing systems fail to fully integrate and display notification messages to occupants and the occupants' responses in relation to a physical location.

For example, U.S. Pat. No. 6,529,128 discloses a separate alarm system in which occupants in an area can go to a route indicator. The route indicator provides escape route instructions to building occupants. The escape route is determined based on input from sensors. The problem with this system is that it is separate from existing telecommunications systems, it is not interactive with occupants, it fails to use acoustic sensors, and it fails to use physical maps to display interactive information to aid potential emergency responders.

Other systems, such as disclosed in U.S. Pat. No. 7,366,674, use a hierarchical map for displaying the status of occupants of a building. The system allows occupants to provide location status during emergency conditions. However, this system fails to leverage existing telecommunications system's acoustic sensors and does not provide an integrated solution for displaying status, notifications, and responses on a physical map.

Patent Application Publication 2005/0244014 discloses using an acoustic sensor in a telephone. This system also discloses sending a notification to a user and receiving a response from the user. However, the system does not disclose an integrated solution for displaying status, notification, and responses on a map. Moreover, the system does not disclose utilizing additional capabilities of acoustic sensors to monitor for events in addition to temperature.

U.S. Pat. No. 7,986,231 describes using a plurality of communication devices that are each located at different physical locations as acoustic sensors in order to monitor the physical location of its communication device, and reports acoustic events detected by its acoustic sensor to a manager. The manager displays a map which shows the physical locations, the events detected by the acoustic sensor in each communication device, sent notification messages, and received response messages. However, the system does not take action to control or counteract the noise.

Noise level in a work environment tends to reduce worker productivity. In office environments, a steep productivity drop down to one third relative to the productivity that would be present in a quiet room may be experienced. Techniques are known for noise cancellation and noise masking, but such techniques are useful primarily in limited circumstances, such as a limited physical zone in which cancelling sound waves can be generated and applied in order to approximately cancel or mask an unwanted noise. Sound level meters are known, but the known meters are uncommon devices that are designed to measure primarily extremely loud noises. Such devices are not normally used to measure sound levels typically encountered in an office environment, and their cost is a deterrent for their use in long-term monitoring for sporadic or occasional noise bursts.

Therefore, in order to overcome the shortcomings of the prior art identified above, a system and method are needed to measure, and counteract or discourage, the generation of unwanted noise in an office environment.

SUMMARY

Embodiments of the present invention generally relate to an audio sensor network, and, in particular, to a system and method for using microphones in telecommunication terminals as an audio sensor network in order to detect, measure, control, and/or mitigate noise sources.

In one embodiment, a method to mitigate noise in an area monitored by a plurality of telecommunication terminals in communication with a controller, includes: detecting an excessive noise originating in the area monitored by the plurality of telecommunication terminals, the detection performed by one or more terminals of the plurality of telecommunication terminals; identifying a location of a first terminal of the plurality of telecommunication terminals by use of the detected excessive noise, wherein the first terminal is closest to a source of the excessive noise; and providing a mitigation message to the identified first terminal.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
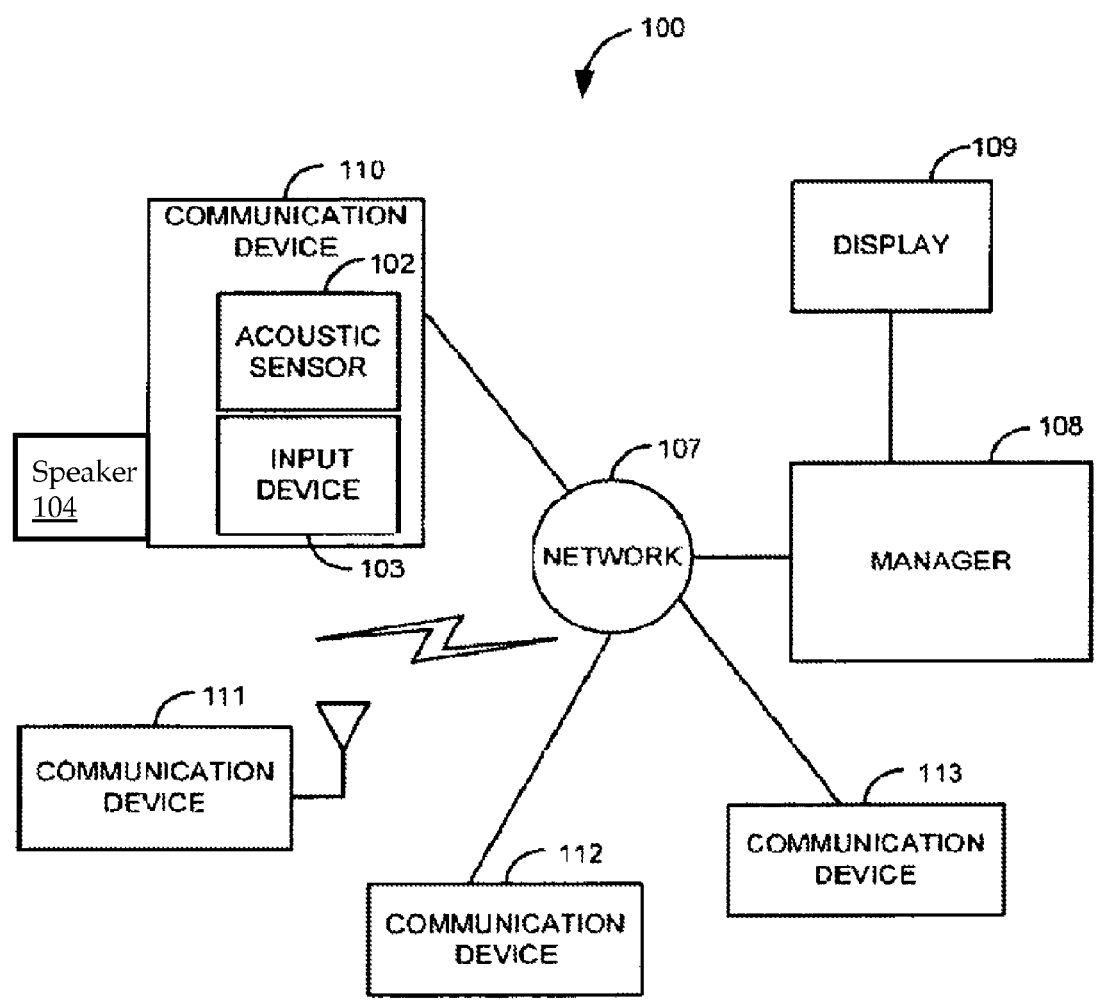
FIG. 1 is a block diagram illustrating an acoustic sensor network in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database (s), the disclosure is not limited to use with any particular type of communication system or configuration of system elements. Those skilled in the art will recognize that the disclosed techniques may be used in any communication application in which it is desirable to utilize microphones in telecommunication terminals as an audio sensor network in order to detect, measure, control, and/or mitigate noise sources.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical data storage medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Embodiments of the present invention provide a system and method for detecting and measuring noise sources in a way that uses microphones in telecommunication terminals as an audio sensor network, allowing for the system and method to attempt to control and/or mitigate the noise sources.

FIG. 1 is a block diagram illustrating an acoustic sensor network 100. The acoustic sensor network 100 comprises a plurality of communication devices 110-113, a network 107, a manager 108, and a display 109. Communication device 110 contains an acoustic sensor 102 (e.g., a microphone), an input device 103 and a speaker 104. Communication devices 111-113 also contain an acoustic sensor and input device (not shown). Communication devices 111-113 are shown to illustrate a plurality of communication devices in an acoustic sensor network 100. Communication devices 110, 112, and 113 connect to network 107 via a wired connection. Communication device 111 connects to the network 107 via a wireless connection. The manager 108 connects to the network via a wired connection. Display 109 connects to the manager 108.

Communication devices 110-113 could be any device capable of sending and receiving data, such as a telephone, a cellular telephone, a Personal Digital Assistant (PDA), a Personal Computer (PC), VoIP terminal, and the like. The acoustic sensor 102 could be any device capable of receiving, and optionally sending, acoustic signals, such as the combination of a microphone and speaker 104. The input device 103 could be any device capable of receiving input, such as a key pad, a keyboard, a touch screen, a microphone, and the like. The input device 103 could be a microphone in the acoustic sensor 102. An occupant is any user of the communication device 110-113. In addition, an occupant could be a visitor to the location acoustically monitored by the acoustic sensor 102. The manager 108 could be any device capable of sending and receiving messages, such as a PC, a Private Branch eXchange (PBX), a router, a Session Initiation Protocol (SIP) proxy server, and the like. The manager 108 could comprise multiple devices. The display 109 could be any device capable of displaying images, such as a PC, a telephone, a PDA, a Cathode Ray Tube (CRT), a Liquid Crystal Display (LCD), and the like. The display 109 could be a remote display using a wireless connection.

The network 107 could be any type of network, such as a wired network, a wireless network, a fiber optic network, and the like. Communications devices 110-113 may communicate with the manager 108 via the network 107 or may be hardwired directly to the manager 108. The communication devices 110-113 can communicate with the manager 108 by using a variety of protocols, such as Internet Protocol (IP), Asynchronous Transfer Protocol (ATM), Time Division Multiplexed (TDM), SIP, 802.11G, and the like.

The communication devices 110-113 are located at different physical locations. The acoustic sensor 102 monitors the physical location around communication device 110 to detect events. The acoustic sensor 102 in communication device 110 can monitor a physical location in a variety of ways to detect an event. For example, the acoustic sensor 102 can monitor for other events, such as the sound of a person speaking, a loud conversation among multiple persons, a malfunctioning mechanical device, a loud speakerphone, and the like. Communication device 110 reports the events of the acoustic monitoring to the manager 108. Communication devices 111-113 also monitor their corresponding physical locations and report the events of the acoustic monitoring to the manager 108.

The communication devices 110-113 may be located in close enough proximity with at least one neighboring communication devices 110-113 in order to provide correlated detected audio events. That is, an audio event occurring near communication device 112 may be detected primarily by communication device 112, but may also be detected at a lower level by communication device 111 and/or communication device 113.

Figure 2:
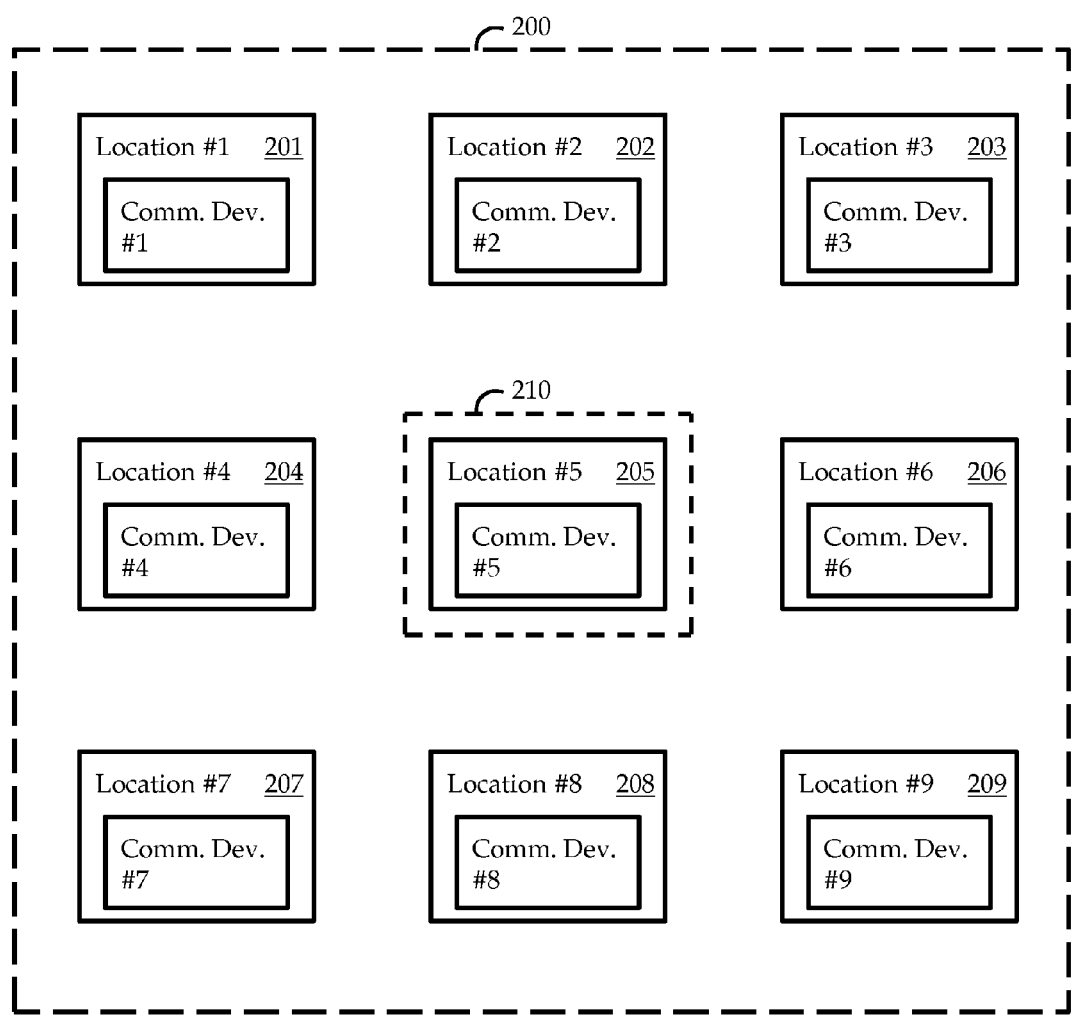
FIG. 2 is a diagram illustrating a map showing a physical location in relation to a plurality of communication devices in an acoustic network, in accordance with an embodiment of the present invention.

FIG. 2 illustrates a map 200 of telecom terminal locations 201-209, showing an exemplary relative physical arrangement. Other exemplary physical arrangement may be used, having different numbers of terminal location, or different placements of terminals (e.g., non-grid-shaped placement, or different size grid, etc.). Terminal locations may be relatively well-known and static, e.g., for a wired desktop communication device. Terminal locations may also be relatively lesser-known and changing, e.g., for a mobile device such as communication device 111, but capable of being tracked or of reporting its location.

Each of telecom terminal locations 201-209 includes one or more communication devices such as communication devices 110-113. The communication devices at telecom terminal locations 201-209 may be in acoustic proximity to one or more communication devices at neighboring telecom terminal locations 201-209. Acoustic proximity may refer to a level or degree of acoustic coupling between an acoustic source and an acoustic detector. Acoustic proximity, when in reference to two or more acoustic detectors, may also refer to a level or degree of difference in sounds from an acoustic source which are detected at the two or more acoustic detectors. Acoustic proximity may be a result of a physical arrangement such that sounds detected at one of telecom terminal locations 201-209 may also be similarly detectable at another of telecom terminal locations 201-209, for example detectable at a higher or lower volume depending on the source or its location, or with reverberations, or detectable but modified depending on the transfer characteristics of the acoustic path or coupling between terminal locations, etc. Acoustic proximity is not necessarily indicative of physical proximity. Some locations such as terminal location 205 may be at least partially shielded by an acoustic shield 210. Acoustic shield 210 may be in the form of a wall, cubicle partition, sound-absorbing material, etc., such that terminal location 205 is in reduced acoustic proximity to other terminals of terminal locations 201-209.

A predetermined threshold level may be taken into consideration when determining acoustic proximity. For example, if sounds from a first terminal location at a first intensity level are detected at a second terminal location at or less than a predetermined lower intensity compared to the first terminal location (e.g., 10 dB or more lower), then the first and second terminal locations may be considered to be acoustically isolated (i.e., not acoustically proximate within the predetermined limit). Acoustic proximity in this embodiment may be understood as terminals being arranged such that there is less than a predetermined level of acoustic attenuation of an acoustic signal emitted at the first terminal and received at the second terminal. The acoustic signal may be emitted by a user of the first terminal, by another noise source close to the first terminal relative to a separation distance from the first terminal to other terminals, or may be emitted by the terminal itself.

Acoustic attenuation, acoustic transfer function, or the like, may also be dependent upon a spatial acoustic transmission pattern of an acoustic source, and/or a spatial acoustic reception pattern of an acoustic receiver. For example, speaker 104 of telecom terminal 110 may emit sounds preferentially in a cone-shaped solid angle pointed in the likely direction of a user of the telecom terminal 110. Similarly, the acoustic sensor 102 of telecom terminal 110 when operating in speakerphone mode, may have highest sensitivity to sounds produced within a cone-shaped solid angle pointed in the likely direction of a user of telecom terminal 110. Therefore, acoustic proximity among telecom terminals may change with rotational movement of telecom terminal 110 even if the physical separation does not substantially change, as spatial acoustic transmission and/or reception patterns are pointed toward or away from one another or an acoustically-reflective surface. In another embodiment, acoustic proximity may be calculated by determining whether a noise from a first terminal would be attenuated to a predetermined sound intensity level or below. For example, suppose there exists an ambient background noise level at the second terminal which is not objectionable to a user at the second terminal. Suppose also that a noise generated at the first terminal at a first intensity level is detected at the second terminal location at a second intensity level. Then the noise may not be objectionable to a user of the second terminal if the second intensity level is below the ambient background noise level. In this method of determining acoustic proximity, more physically proximate terminals will be acoustically proximate to a loud noise from the first terminal than to a less loud noise from the first terminal.

In map 200, each of telecom terminals 201-209 may have associated information such as: the occupant name, a telephone extension number, the device number, detected audio events, occupant responses, audio proximity to one or more physically proximate telecom terminals, and notifications sent. Other information could be stored, accessed, and/or displayed based on implementation.

Embodiments in accordance with the present invention use the microphones in telecommunications terminals 201-209 as an acoustic sensor array in order to measure the level of noise in a location, e.g., a workplace environment illustrated by map 200. For example, the microphones may be embedded in VoIP phones, which can be viewed as a microphone and speaker attached to a processor with memory that is already attached to a network. Embodiments in accordance with the present invention may also be usable with microphones found in desktop computers, portable computers, and mobile phones, etc.

In such an acoustic sensor array, privacy or lack of privacy as perceived by workers or other persons within acoustic range of the communication devices at telecom terminal locations 201-209 may become problematic, but which may be overcome with worker education and training. Embodiments in accordance with the present invention may transmit minimal information from telecom terminal locations 201-209. At predetermined times or time intervals, (e.g., in the range of a few seconds to a few minutes), the system may report only a measure of the loudness and/or a characterization of the type of noise (e.g., conversation, music, mechanical, etc.).

In accordance with an embodiment of the present invention, sound may be measured for terminal locations 201-209 only at the single position of the telecom terminal, i.e., the spatial resolution may be limited. Limited spatial resolution may be compensated by correlating audio detected at acoustically proximate terminal locations.

Another consideration in accordance with an embodiment of the present invention is that at the noisiest and therefore the most important times to measure noise, some of the communication devices at telecom terminal locations 201-209 are unavailable for measuring noise because they currently may be used for telephony. Therefore, an analysis module may perform calculations without measurements from all terminal locations 201-209.

Embodiments in accordance with the present invention may perform passive monitoring. Unused telecom terminals within the area of map 200 may be used to monitor and record the noise in a location such as a building, workplace, etc. The monitoring may be done during a typical work day, or may be done in preparation for an event (e.g., shift starting time or shift change).

Once the acoustic data is gathered, a variety of displays or reports can be generated from the gathered data. Embodiments in accordance with the present invention may track the loudness of a monitored office, and/or the sources of noise, throughout the day. Upon command, embodiments in accordance with the present invention may produce displays or reports, e.g., showing the noise levels on a map of a monitored area, or showing noisy locations, and so forth. Direction-finding techniques such as triangulation or correlating detected noise volumes may be used to attempt to locate sources of noise. Reports may include an animation on a map of the pattern of noise throughout the day. The data gathered may be useful to analyze: noise level throughout the day; location of quiet offices (i.e., offices not strongly acoustically coupled to other offices) either for assigning to sensitive users who can benefit from less incoming noise, or for assigning to noisy users for the benefit of less outgoing noise to neighboring offices; whether the noise level varies (e.g., diurnally) during the day; and whether any attempts at noise mitigation, as discussed below in further detail, are successful.

In the analysis, data from communication devices may be given a weight that varies with certainty of location. For example, data from fixed or relatively immobile terminals may be given more weight than data from mobile devices that are relatively mobile and that may have less certainty regarding their location.

Embodiments in accordance with the present invention may provide a system for long term, continuous monitoring of an acoustic environment. In such a monitoring mode, the system may provide warnings either to individual users who are generating excessive noise, or to a physical region encompassing more than one communication device at terminal locations 201-209. Warnings may include, for example, a textual or graphical message on a screen, a visible indicator such as a light source (e.g., LED) on/off or blinking or color change, an audible indicator (e.g., beep, tone, buzz, spoken message, etc.), a vibration, a message delivered via a separate communication channel (e.g., an email message, or a text message delivered to the telecom terminal or to a second telecom terminal such as a cell phone that may be associated with the first telecom terminal), and so forth. Such embodiments may also provide access to archived historical monitoring in order to help an analyst uncover longer-term trends.

Embodiments in accordance with the present invention may provide a capability for active testing. For example, the speakers of the communication devices at terminal locations 201-209 may be used to generate audio signals of known characteristics (e.g., volume and/or spectral content, etc.) in order to provide stimulus for measurements at physically proximate terminal locations 201-209. The sound levels detected at physically proximate terminal locations 201-209 may be analyzed to calculate acoustic proximity of such terminals. Such tests may be irritating to humans and may be contaminated by users, so such tests would most likely be conducted when the workplace is empty, such as late at night, or before people have begun to occupy it, or weekends. The testing may allow an analyst to understand how noise spreads from a given source, and measurements could establish whether the generated audio signals of known characteristics accurately models what is observed in actual usage.

Embodiments in accordance with the present invention may be useful to provide early detection of unexpected noise, or lack of expected noise, in a variety of application. For example, unexpected noise originating from an occupied room may be indicative of an emergency situation. Conversely, lack of noise originating from an equipment room may be indicative of a breakdown of equipment that may generate noise, such as air conditioning in a server room.

Referring again to FIG. 1, manager 108 receives reports of the acoustic monitoring from the communication devices at terminal locations 201-209. Based on the reports of the acoustic monitoring, manager 108 determines if a first notification message needs to be sent to at least one and/or all of the communication devices at terminal locations 201-209. If it is determined that the first notification message needs to be sent, the first notification message is sent to at least one and/or all of the communication devices at terminal locations 201-209. Manager 108 displays a map 200 in display 109 that contains at least one and/or all of the events of the acoustic monitoring. If the first notification message was sent to one or more of the communication devices at terminal locations 201-209, the manager 108 may update map 200 in the display 109 to show the notification message(s).

In response to the first notification, one or more of the communication devices at terminal locations 201-209 send a response message containing an audio status to the manager 108. The response message could be based on audio measurements. The manager 108 updates the map 200 in the display 109 to show the received response message(s) from communication devices at terminal locations 201-209. Based on the received response message(s), the manager 108 sends a second notification message to one or more of the communication devices at terminal locations 201-209. The manager 108 updates the map 200 in the display 109 with a second notification message(s) in conjunction with the locations of telecom terminals 201-204. The manager 108 can archive the events and notification messages. In addition, the manager 108 could send the map to a remote display (not shown) such as a remote display at fire station and the like.

Figure 3:
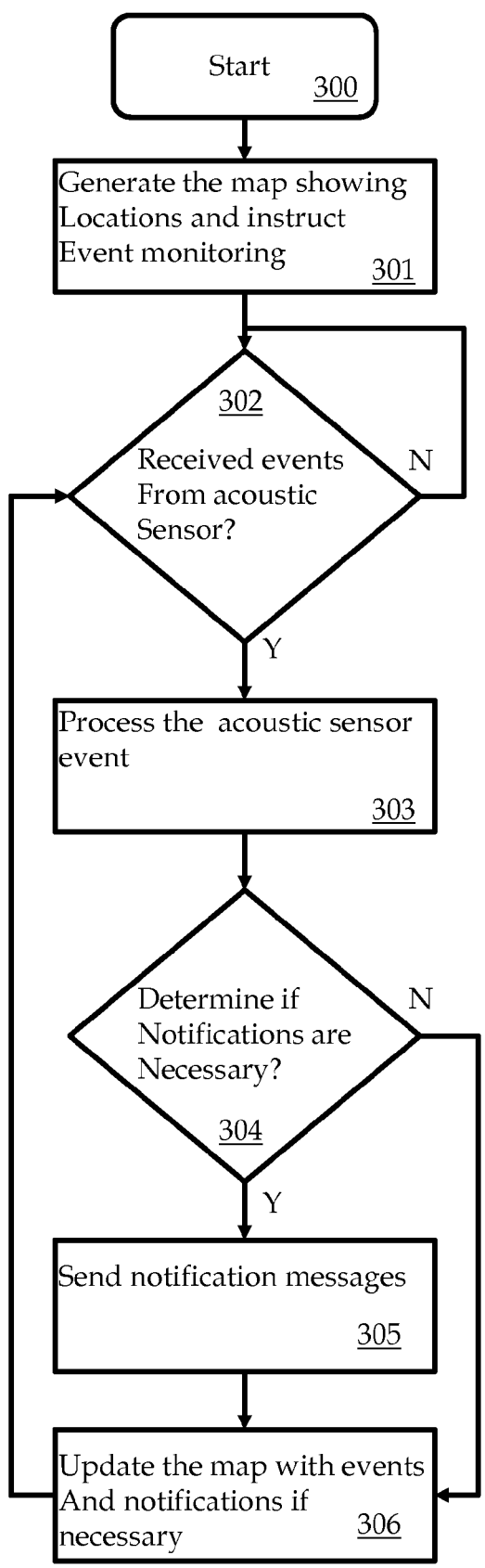
FIG. 3 illustrates a method for generating and updating a map that shows physical locations of communication devices in an acoustic network, in accordance with an embodiment of the present invention.

FIG. 3 illustrates a method, in accordance with an embodiment of the present invention, for generating and updating a map 200 that shows acoustic alerts associated with physical locations 201-209 of communication devices 110-113 in an acoustic sensor network 100. Illustratively, the manager 108 and communication devices 110-113 are implemented as stored-program-controlled entities, such as a computer, which perform the method of FIGS. 3-7 by executing a program stored in a storage medium, such as a memory or disk. The process starts 300 by generating 301 the map 200 that shows the physical locations (terminal locations 201-209) of communication devices 110-113 in display 109, and by instructing the communication devices 110-113 to monitor for one or more events. The acoustic sensor associated with terminal location 201 monitors location 201 for the one or more events. Likewise, the acoustic sensors associated with terminal locations 202-209 monitor the locations 202-209 for the one or more events. Communication devices 110-113 report the events of the monitoring to the manager 108.

The manager 108 waits to receive 302 the reported events from one or more of the communication devices 110-113. If no reported events are received 302, the manager 108 waits to receive 302 the reported events. If the manager 108 receives 302 reported events from acoustic sensor 102, the manager 108 processes 303 the reported event(s) to determine 304 if a notification message based on location should be sent. If the manager 108 determines 304 that a notification message is not necessary, the process goes to step 306. Otherwise, if the manager 108 determines 304 that a notification message is necessary, the manager 108 sends 305 a notification message that may contain occupant instructions to at least one of the plurality of communication devices 110-113. The manager 108 updates 306 the map 200 with at least one of the events and at least one of the notification messages in conjunction with terminal locations 201-202. The manager 108 then waits to receive 302 a reported event from communication devices 110-113.

Figure 4:
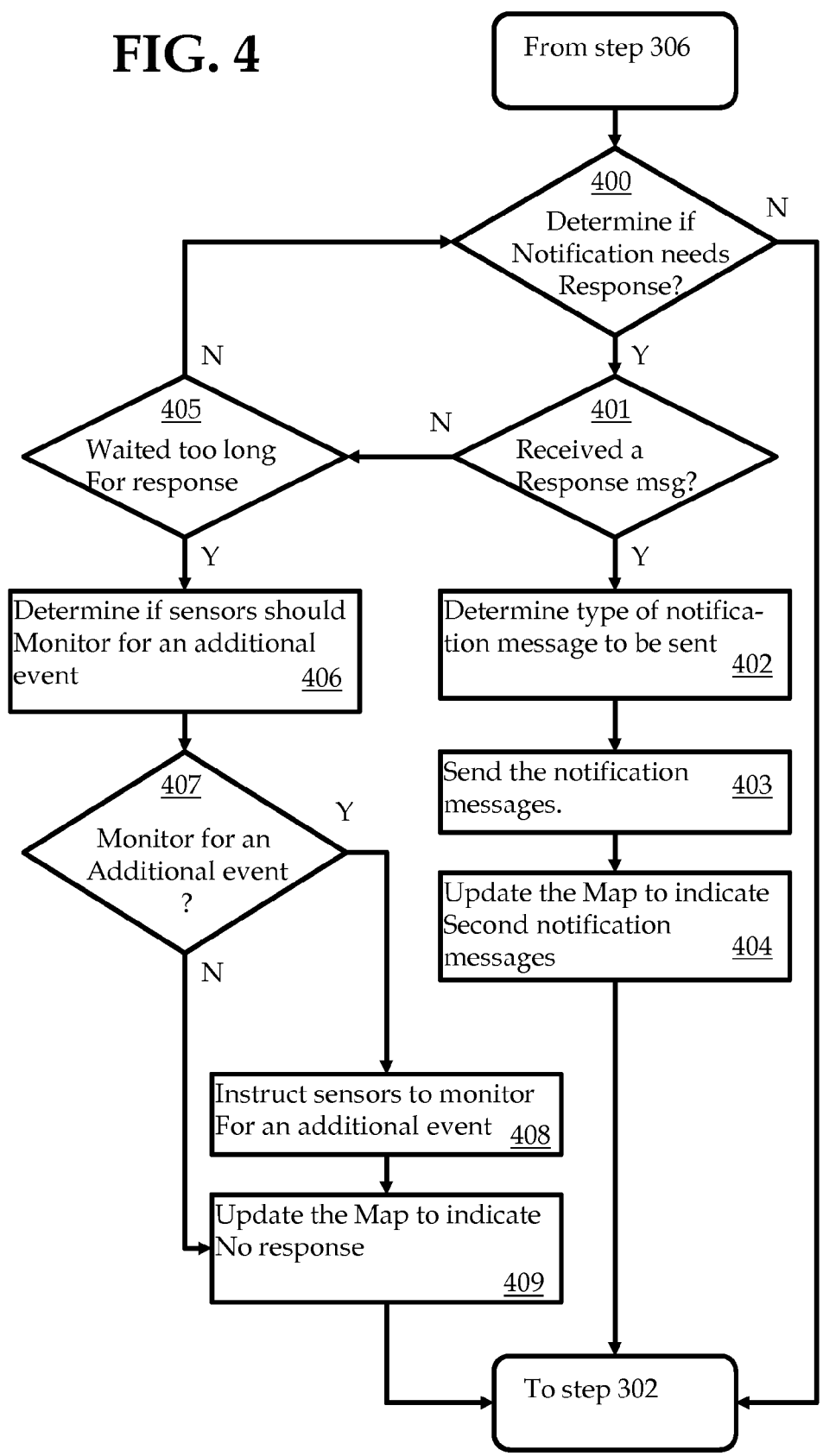
FIG. 4 illustrates a method for displaying notification and response messages in a map that show physical locations of communication devices in an acoustic network; in accordance with an embodiment of the present invention.

FIG. 4 is method for displaying notification and response messages in a map 200 that shows physical locations (terminal locations 201-209) of communication devices 110-113 in an acoustic sensor network 100. FIG. 4 is a flow diagram that is inserted between steps 306 and 302 in FIG. 3. After updating 306 the map 200 with event(s) and the notification message if necessary, the manager 108 determines 400 if a notification message was sent that requires a response message. If no response message is necessary or no notification message was sent, the process goes to step 302 in FIG. 3. Otherwise, the process goes to step 401.

In response to the sending 305 of the notification message to one or more of the communication devices 110-113, the manager 108 waits to receive 401 a response message from one or more of the communication devices 110-113. If no response message is received, the manager 108 determines 405 if the manager 108 has waited too long without receiving a response from one or more of the communication devices 110-113. If the manager 108 determines 405 that the manager 108 has waited too long, the process goes to step 406. Otherwise, if the manager 108 determines 405 that the manager 108 has not waited too long, the process waits to receive 401 a response message from one or more of the communication devices 110-113.

The manager 108, after receiving 401 a response message, optionally determines 402 what type of notification message will be sent. For example, if the response message from step 401 indicates that a user of a noisy terminal has not lowered their noise level, the notification message sent in step 403 could tell the user that more aggressive and intrusive steps may be taken to reduce the noise. The manager 108 sends 403 the notification message to the appropriate communication device(s) 110-113. The manager 108 updates 404 the map 200 in the display 109 with the notification message. The process then goes to step 302 in FIG. 3.

If the manager 108 determines 405 that it has waited too long and has not received a response message, the manager 108 determines 406 if the acoustic sensor 102 should monitor for an additional event. For example, the manager 108 could determine that the acoustic sensor 102 in communication device 110 should listen for someone talking. If the acoustic sensor 102 needs to monitor 407 for an additional event, the manager 108 instructs 408 the acoustic sensor 102 in communication device 110 to monitor for an additional event. The manager 108 updates 409 the map 200 in display 109 to indicate that no response message was received. The process then goes to step 302 in FIG. 3. Otherwise, if the acoustic sensor 102 does not need to monitor 407 for an additional event, the process updates 409 the map 200 in display 109 to indicate that no response was received. The process then goes to step 302 in FIG. 3.

Figure 5:
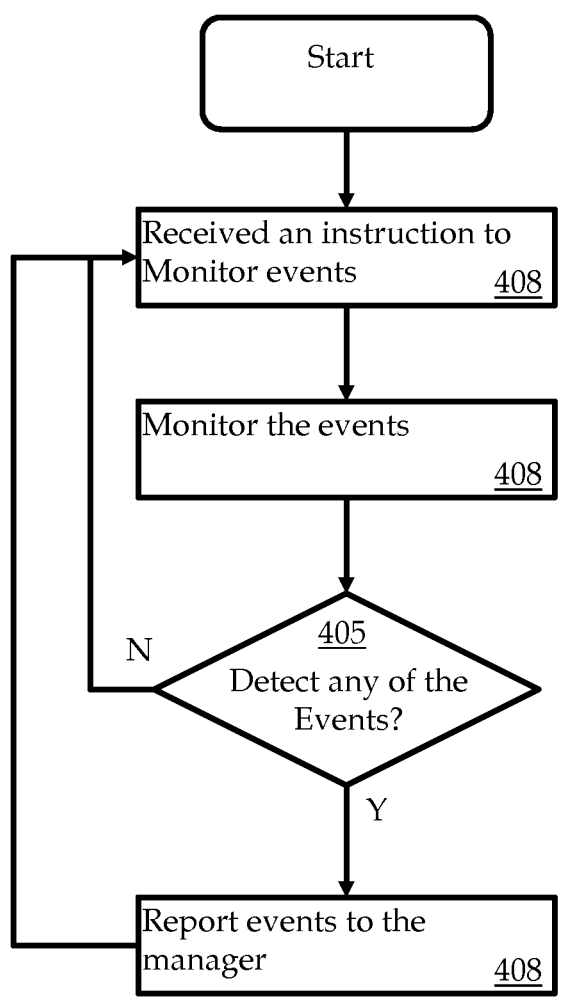
FIG. 5 illustrates a method for monitoring and reporting acoustic events in a communication device, in accordance with an embodiment of the present invention.

FIG. 5 is a method for monitoring and reporting acoustic events in a communication device 110-113. The process begins when a communication device 110-113 receives 500 an instruction to monitor one or more events. The instruction could be an initial instruction (step 301) to monitor events such as loud conversations, loud speakerphones, and the like. The instruction could be to monitor for an additional event (step 408) such as listening for voice sounds if the occupant is not responding to notification messages. Another option would be where there is a default set of events that the communication device 110-113 monitors without receiving an instruction. Upon receiving 500 the instruction, the acoustic sensor in the communication device(s) 110-113 monitors 501 for event(s). If the acoustic sensor in the communication device(s) 110-113 does not detect 502 any of the events, the acoustic sensor in the communication device 110-113 monitors 501 for the event(s). When the acoustic sensor in the communication device 110-113 detects 502 one or more of the monitored events, the communication device 110-113 reports 503 the event(s) to the manager 108.

Figure 6:
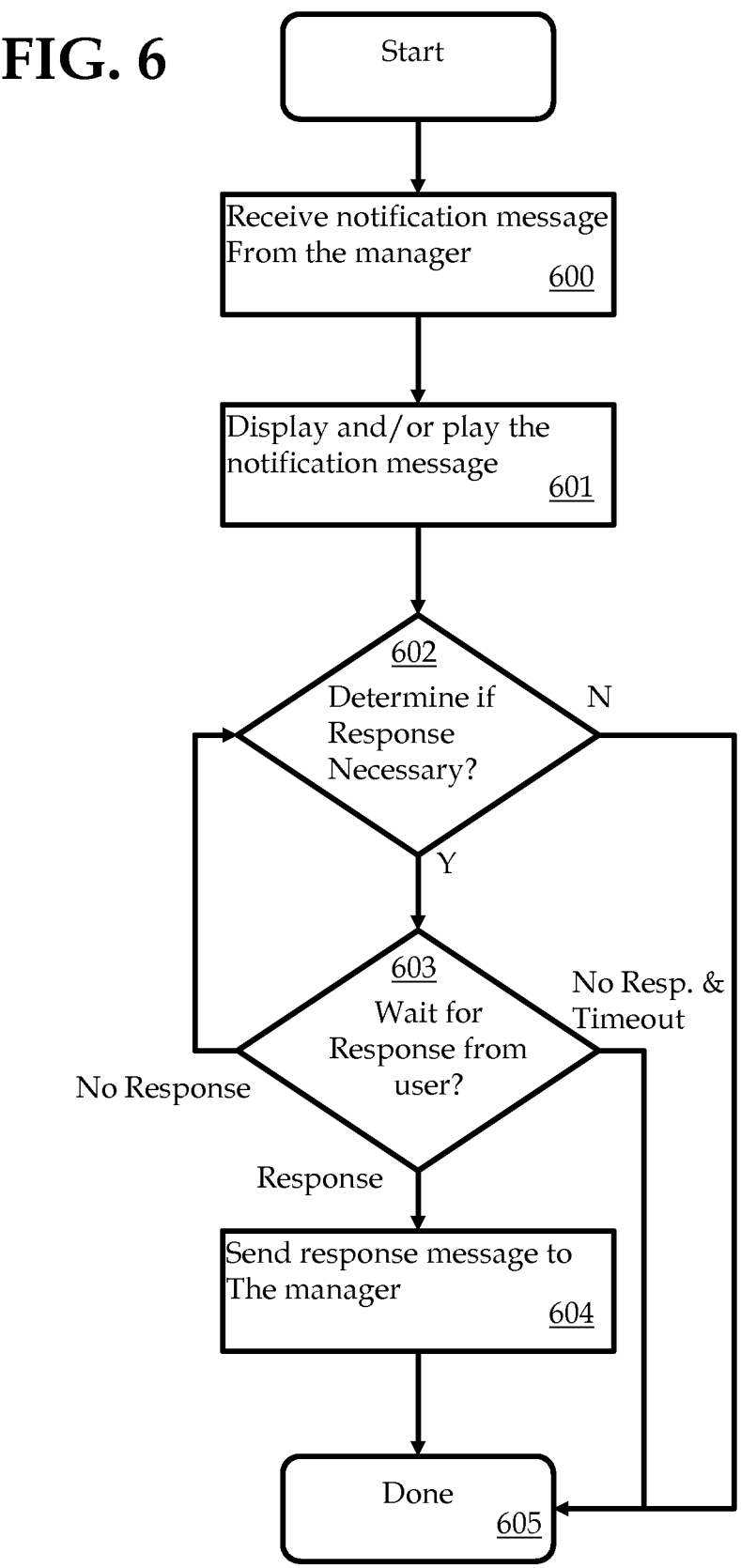
FIG. 6 illustrates a method for receiving notification messages and sending response messages in a communication device, in accordance with an embodiment of the present invention.

FIG. 6 is a method for receiving notification messages and sending response messages in a communication device 110-113, in accordance with an embodiment of the present invention. The flows in FIG. 6 are given sequentially, but standard techniques could be employed to handle concurrency (e.g. queues, priorities, and the like). The process begins when the communication device 110-113 receives 600 a notification message from the manager 108. The communication device 110-113 displays and/or plays 601 the notification message. The notification message may be, for example, a textual or graphical message on a screen, a visible indicator such as a light source (e.g., LED) on/off or blinking or color change, an audible indicator (e.g., beep, tone, buzz, spoken message, etc.), a vibration, a message delivered via a separate communication channel (e.g., an email message, or a text message delivered to the telecom terminal or to a second telecom terminal such as a cell phone that may be associated with the first telecom terminal), and so forth. The communication device 110-113 determines 602 if a response is necessary. If a response is not necessary, the process is done 605.

Otherwise, if the communication device 110-113 determines 602 that a response is necessary, the communication device 110-113 waits 603 for a response from the occupant. The communication device 110-113 waits 603 until either there is a response from the occupant, or there is a timeout and no response. If there is a timeout before receiving a response from the occupant, the process is done 605. Otherwise, if there is a response from the occupant, the communication device 110-113 sends 604 a response message to the manager 108 and the process is done 605. The response message may include a response from the occupant.

Consider the following example of a process using the combined methods of FIGS. 3-7 and the map 200 in FIG. 2. The manager 108 instructs 301 the communication devices 110-113 to monitor for loud conversations, conference calls, and the like. The manager 108 then waits to receive 302 a report of the events from the communication devices 110-113. The communication devices 110-113 receive 500 the instructions to monitor the events from step 301. The acoustic sensors in communication devices 110-113 monitor 501 for the events. The acoustic sensor 102 in communication device 110 detects 502 an acoustic event. The detection 502 of the acoustic event may be accomplished by, for example, periodically checking the measured noise level or characteristics against a noise loudness limit or against known signatures of unwanted noise. The communication device 110 reports 503 the acoustic event to the manager 108.

Detection of an acoustic event ordinarily occurs when an acoustic measurement matches the stored signature of a known acoustic event, with at least a predetermined level of confidence. The stored signature may be, for example, exceeding a sound intensity level (dB SIL), or exceeding sound intensity level in a bandwidth corresponding to the frequency response of a speaker in a telecom device 110-113, or exceeding a threshold level of a parametric template of human speech or other expected audio source within the area depicted by map 200.

The manager 108 receives 302 a report from the acoustic sensor 102 in communication device 110 of an acoustic event. The manager 108 processes 303 the acoustic event report and determines 304 that a sending a notification message is not necessary. The manager 108 updates 306 the map 200 to indicate an acoustic status of terminal location 201. The manager 108 determines 400 that since no notification was sent, the manager 108 does not need to wait for a response from communication device 110. The process goes to step 302.

The acoustic sensor 102 in communication device 110 detects 502 an acoustic event in terminal location 201. Communication device 110 reports 503 the acoustic event to the manager 108. The manager 108 receives 302 the acoustic event from communication device 110. The manager 108 process 303 the acoustic event and determines 304 that a notification message containing a request to reduce noise should be sent to communication device 113.

The manager 108 determines 400 that the notification message sent in step 306 to communication device 113 requires a response message or other indication that noise has been reduced. The manager waits (401, 405) for a response message from communication device 113. Communication device 113 receives 600 the notification message from step 305. Communication device 113 alerts the user by displaying and/or playing 601 the notification message. Communication device 113 determines 602 that a response is necessary. The determination may include receiving an instruction from the manager that a response is necessary. Communication device 113 may instruct the user to respond (e.g., to confirm a step has been taken to reduce noise), or communication device may respond without input from the user (e.g., by providing an updated noise measurement). After waiting 603 for the response, communication device 113 sends 604 a response message to the manager 108.

In the above example, if the user of communication device 113 did not respond (no response and timeout 603) and the manager 108 determined 405 that it had waited long enough for a response, the manager 108 determines 406 that the acoustic sensor in communication device 113 should monitor 407 for a specific event. The manager 108 instructs 408 the acoustic sensor in communication device 113 to acoustically monitor for the additional event of someone talking. The manager 108 updates 409 the map 200 to indicate that no response was received to the notification message requesting a response from terminal location 204. The process goes to step 302 and the manager 108 waits to receive 302 event(s) from the acoustic sensor in communication device 113.

Communication device 113 receives 500 the instruction from step 408 to monitor the additional event of detecting someone talking. The acoustic sensor in communication device 113 monitors 501 the event of someone talking. The acoustic sensor in communication device 113 detects 502 the event of someone talking at terminal location 204. Communication device 113 reports 503 the event of someone talking at terminal location 204 to the manager 108. The manager 108 receives 302 the reported event of someone talking from communication device 113. The manager 108 processes 303 the event of detecting someone talking and determines 304 that a notification is not necessary. The manager 108 updates 306 the map 200 to indicate the event of hearing someone talking at terminal location 204.

In addition to monitoring the noise in the environment, embodiments in accordance with the present invention may use that information to attempt to control or counteract the noise. Sample scenarios that together illustrate approaches in accordance with an embodiment of the present invention are described below.

One Noisy Person on a Telephone Call. Suppose that monitoring an area, in particular a neighborhood of offices, reveals a great deal of noise in the area, and all acoustic signals indicate that it is from a single speaker in one terminal location who is on a call, for example terminal location 204 as illustrated in FIG. 2. Although this and other examples herein will be illustrated with reference to specific terminal locations, such as terminal location 204 and its surrounding terminal locations, persons of skill in the art will recognize how to modify this process for different terminal locations.

Embodiments in accordance with the present invention may correlate the noises detected at terminal locations that are acoustically proximate to terminal location 204, for example terminal locations 201, 202, 205, 207 and 208, to determine that the acoustic stream going into the speaker of the telecom terminal in location 204 is the same as the one perceived in the neighboring terminal locations 201, 202, 205, 207 and 208.

The action taken to control or counteract the noise from terminal location 204 may depend on the date and/or time, and/or presence information. Presence information is information, sensor measurements, computer activity, self-identification, or the like, which is probative of whether or not other humans are nearby. For example, if this scenario takes place at 5:00 AM and presence information indicates that there is no one else in that area, then no action needs to be taken. However, if the present date and time indicate the middle of a workday, and activity from presence indicators including audio signatures of human presence (e.g., other voices, keyboard noises, paper shuffling, computer terminal activity, etc.) indicates that neighboring offices are occupied, then embodiments in accordance with the present invention may take one or more steps to try to control or counteract the noise. Embodiments in accordance with the present invention may start by sending a "noise warning" to the telephone in the form of a textual message and an indicator to the user, e.g., a blinking light that indicates a polite first-level message such as "Please speak more quietly." Embodiments in accordance with the present invention may instead or in addition deliver the message using the audio channel of the offending terminal. A message delivered on the audio channel may start at a relatively unobtrusive level, such as a whisper over an existing conversation on the audio channel. If the noise continues, then embodiments in accordance with the present invention may take steps of increasing severity or intrusiveness, such as blocking the audio channel entirely or otherwise interrupting the call for a warning message, or termination of the call.

Figure 7:
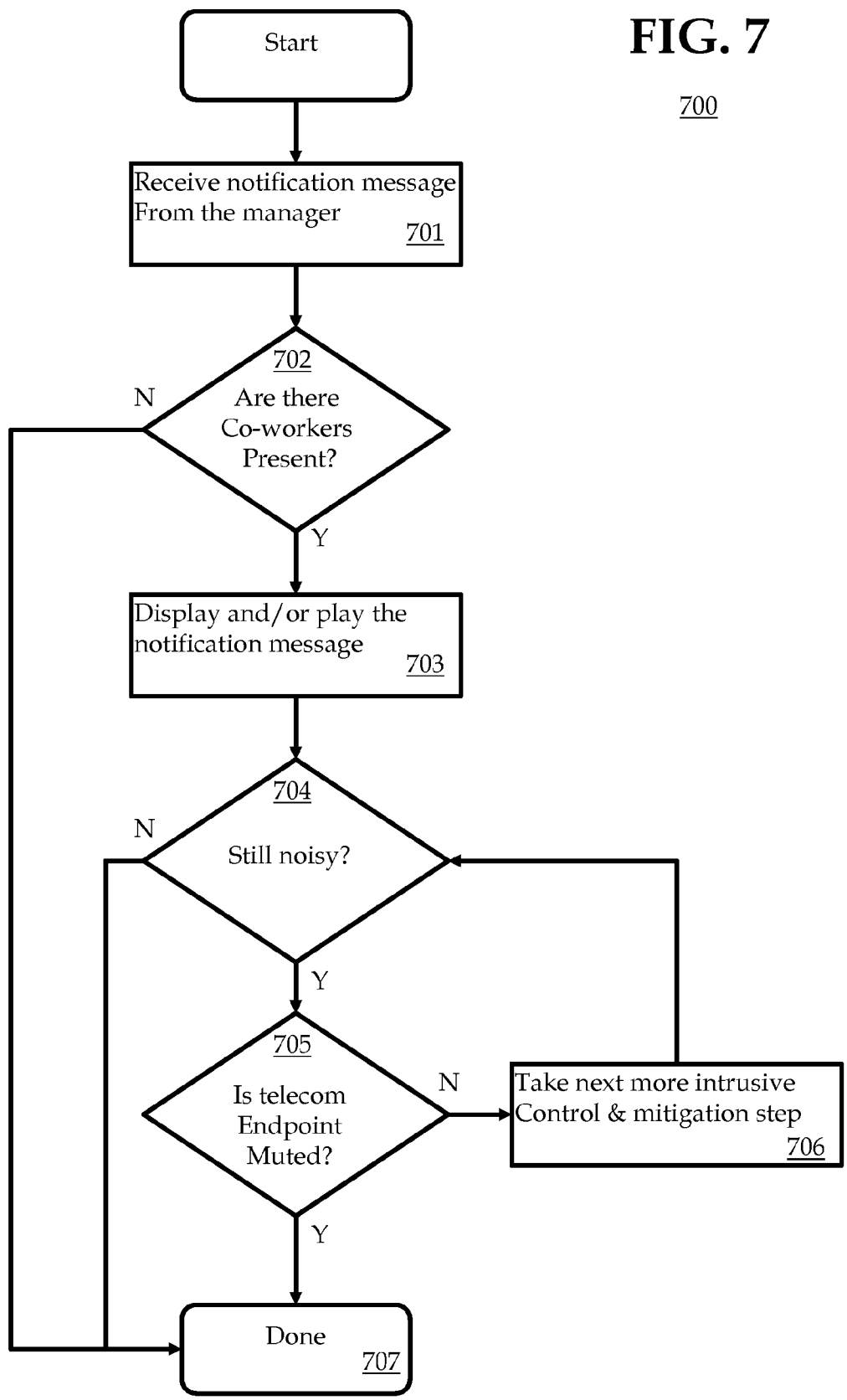
FIG. 7 illustrates a method for controlling and or counteracting a noisy user of a communication device, in accordance with an embodiment of the present invention.

FIG. 7 illustrates a process 700 for controlling and/or counteracting noise in an area monitored by an array of telecom terminals, in accordance with an embodiment of the present invention. Process 700 begins at step 701, at which a telecom terminal, such as a terminal located at telecom terminal location 204, receives a notification message from a system manager that there is excessive noise being generated at the terminal.

At step 702, the system will query whether co-workers are present. In some embodiments in accordance with the present invention, the query may be made by way of comparing the present date, time, and/or day of week against indicia of a work schedule such as typical first-shift scheduled hours, weekends, holiday schedule, and so forth. In some embodiments in accordance with the present invention, step 702 may involve monitoring the terminals at the terminal locations 201-209 for audio sounds, activity on telephones or computers, or other activities that would be evidence of the presence of co-workers who might be affected by a noisy environment caused by the terminal at location 204. Evidence of the effect on neighboring terminals may be weighted according to the acoustic proximity of those terminals to terminal location 204, with evidence from the terminals that are the most acoustically proximate being given the highest weighting. If there are no co-workers present, and/or if the effect on neighboring terminals from terminal location 204 does not exceed a predetermined threshold, then control of process 700 passes to step 707 at which process 700 is done.

If the result of step 702 is that there are co-workers present, and/or the effect on neighboring terminals from terminal location 204 does exceed a predetermined threshold, then control of process 700 passes to step 703.

At step 703, an audio and/or visual message is presented to the user of the offending terminal location 204 in order to request that the user be more quiet. The audio and/or visual message is selected from a list of predetermined audio and/or visual notifications. The notifications in the list may vary from one another in their level of intrusiveness and/or immediacy as perceived by the user. The least intrusive audio and/or visual notification is ordinarily presented first, for example a blinking light or icon. Control of process 700 then passes to step 704.

At step 704, after a relatively brief delay in order to allow the user of the offending terminal location 204 to receive, understand, and act upon the audio and/or visual notification presented to the user, the system will determine whether the user at the offending terminal location 204 is still too noisy, as determined by monitoring of the terminals that are in audio proximity to terminal location 204. If the user is not still noisy (i.e., the user at the offending terminal location 204 has quieted to below a threshold level, or has quieted by more than a threshold amount), then control of process 700 passes to step 707 at which process 700 is done. Otherwise, control of process 700 passes to step 705.

At step 705, the system queries whether the offending terminal location 204 has been completely muted yet, such as by action of the system. If the result of the query is positive, then control of process 700 passes to step 707 at which process 700 is done because the system has performed all of the control and/or mitigation that it is able to perform. If the result of the query at step 705 is negative, then control of process 700 passes to step 706.

At step 706, the next more intrusive control and/or mitigation step is taken in order to make the user of the offending terminal location 204 be more quiet. Examples of more intrusive step may be to inject a message onto the audio signal, or a longer or louder message, and so forth. Control of process 700 then passes to step 704.

A Noisy Call on a Speaker Phone. Suppose that ongoing monitoring reveals that the source of noise in a monitored area is a very loud call on speaker that is being heard throughout the monitored area. Embodiments in accordance with the present invention may initiate a sequence of actions, e.g., a visual and/or audio indicator, text messages, audio signals inserted onto the call (e.g., beeps, tones, warning messages, etc.) requesting that the user be more quiet. The severity and intrusiveness may increase, e.g., automatically decreasing the volume of the call, until finally terminating the call if no other warnings are adequate. A person of skill in the art will understand how to modify process 700 to handle this scenario.

Automated Ostracism. In embodiments describe above, the system performs the escalation of the severity of the warnings without human intervention. In other embodiments in accordance with the present invention, users of telecom terminals that are acoustically proximate to the offending terminal may be polled to determine the extent of annoyance caused by the offending terminal. Poll results could be presented to the offending user in order to use peer pressure to reduce the level of noise. Poll results may be used as one of the escalating intrusive control and/or mitigation steps referenced in step 706.

Tracking the Impact of Noise on People. Embodiments described above collect objective data regarding the level of noise in a monitored area. Embodiments in accordance with the present invention may further provide an automated method of registering noise complaints by users of acoustically proximate terminals. For example, an annoyed user may dial an IVR system or visit a web page to register workplace environment complaints. Embodiments in accordance with the present invention may then correlate the objectively measured noise with the subjectively reported measure of annoyance or irritation.

Seat Placement in a Workplace Hoteling Environment. Hoteling may be referred to herein as a situation in which a single workspace is shared among more than one office worker. Similarly, hoteling may also refer herein to a situation in which a single office worker uses more than one single workspace. During hoteling, a user may use a location for a fixed period (e.g., hours, day, days or week). This is a more fluid environment, compared to conventional office environments, in which noise may be a factor used in office assignments. Embodiments in accordance with the present invention may be used to make inferences about workplace habits from measured noise. For example, embodiments in accordance with the present invention may be able: to record at what hours workers are usually present, and which workers; to track noise levels throughout a day; identify noisy areas or workers; identify quiet areas or workers; where is the noise best contained; where is the noise least contained; and/or where is acoustic isolation the best and worst. This information may be useful as input information into a process to assign persons to work locations.

Auto-Shushing. In many social contexts, when people enter an area they begin talking in small groups (e.g., two, three or four people). The conversations continue for a long time at a natural level. As people continue to enter the room and groups continue to form, though, at some point the individuals find it difficult to hear and be heard. At that point people often start speaking more loudly and then so does everyone else around them. This turns into a positive feedback loop. This loop leads to a sharp knee in a curve that plots total noise as a function of number of people—just moments after people were speaking at a conversational level, they are yelling to be heard. If our system notices a sharp rise in noise, it could send out a universal signal (say, textually displayed on all phones, e-mail to computers and the like) to encourage everyone to speak more quietly. This might break the positive feedback loop and quiet down the entire environment.

Embodiments of the present invention include a system having one or more processing units coupled to one or more memories. The one or more memories may be configured to store software that, when executed by the one or more processing unit, allows for the detection, control and/or mitigation of noise in a location having one or more telecom terminals used to monitor noise, at least by use of processes described herein, including at least in FIGS. 2-7, and related text.

For example, the one or more processing units may be configured to monitor audio signals recorded by microphones at each of the telecom terminals, to perform calculations used by or implicit to the methods described herein (e.g., determining relative sound intensity levels, determining acoustic proximity, etc.), and providing resultant mitigation messages or counteractive actions to reduce a detected excessive noise. The audio signals used for monitoring may be provided to the one or more processing units without processing by codecs (e.g., G.711, G.729, etc.).

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms any of followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to mitigate noise in an area monitored by a plurality of telecommunication terminals in communication with a controller, comprising:
    detecting an excessive noise originating in the area monitored by the plurality of telecommunication terminals, the detection performed by one or more terminals of the plurality of telecommunication terminals;
    identifying a location of a first terminal of the plurality of telecommunication terminals by use of the detected excessive noise, wherein the first terminal is closest to a source of the excessive noise;
    providing a mitigation message to the identified first terminal;
    counteracting excessive noise generated at the first telecom terminal, by selecting a first counteractive measure selected from a predetermined group of counteractive measures, wherein members of the group of counteractive measures differ in a level of intrusiveness;
    waiting a predetermined period of time and
    if excessive noise is still detected at the first telecom terminal, counteracting the excessive noise generated at the first telecom terminal by use of a more intrusive counteractive measure selected from the predetermined group of counteractive measures.

2. The method of claim 1, wherein the first terminal is in acoustic proximity to a second terminal of the one or more other terminals of the plurality of telecommunication terminals.

3. The method of claim 2, wherein acoustic proximity comprises less than a predetermined level of acoustic attenuation of an acoustic signal emitted at the first terminal and received at the second terminal.

4. The method of claim 2, wherein acoustic proximity comprises receiving, by the second terminal, an acoustic signal emitted at the first terminal, such that an intensity of the received signal is at least a predetermined level above an ambient noise intensity at the second terminal.

5. The method of claim 1, wherein the step of identifying the location of the first terminal comprises correlating audio signals detected at one or more terminals of the plurality of telecommunication terminals.

6. The method of claim 5, wherein the step of correlating audio signals comprises adjusting for uncertainty in terminal location.

7. The method of claim 1, further comprising: tracking, by the plurality of telecommunication terminals, sound intensity level variations measured by at least one of the plurality of telecommunication terminals.

8. The method of claim 1, further comprising: providing an excessive noise warning to the first telecom terminal.

9. The method of claim 1, further comprising: providing an excessive noise warning to telecom terminals that are in acoustic proximity to the first telecom terminal.

10. The method of claim 2, wherein acoustic proximity is determined by: emitting, at the first terminal, an audible signal having known intensity; and measuring audible intensity of the audible signal as received at the second terminal.

11. The method of claim 1, further comprising: providing a warning of an absence of an expected noise at the first telecom terminal.

12. The method of claim 1, wherein the step of detecting the excessive noise comprises correlating audio signals detected at one or more terminals of the plurality of telecommunication terminals to stored signatures of known acoustic events.

13. The method of claim 1, wherein the excessive noise is counteracted only if other users are within acoustic proximity to the first telecom terminal.

14. The method of claim 1, wherein the predetermined group of counteractive measures comprises disabling at least a portion of the functionality of the first telecom terminal.

15. The method of claim 1, wherein counteracting the excessive noise generated at the first telecom terminal by use of a more intrusive counteractive measure comprises:

polling users of telecom terminals that are acoustically proximate to the first telecom terminal about an extend of noise annoyance; and presenting poll results to a user of the first telecom terminal.

16. A system to mitigate noise in an area, the system comprising:
a plurality of telecom terminals, each telecom terminal comprising a microphone;
an audio sensor array formed from the microphones in the plurality of telecom terminals;
a controller in communication with the plurality of telecom terminals, the controller configured:
to receive audio measurements of an excessive noise from the audio sensor array; and
to identify a location of a first terminal of the plurality of telecom terminals by use of the detected excessive noise, wherein the first terminal is closest to a source of the excessive noise;
to counteract excessive noise generated at the first telecom terminal, by selecting a first counteractive measure selected from a predetermined group of counteractive measures, wherein members of the group of counteractive measures differ in a level of intrusiveness;
to wait a predetermined period of time; and
if excessive noise is still detected at the first telecom terminal, to counteract the excessive noise generated at the first telecom terminal by use of a more intrusive counteractive measure selected from the predetermined group of counteractive measures; and
a transmitter configured to transmit a mitigation message to the identified first terminal.

\* \* \* \* \*